US012775454B2

(12) United States Patent
Stephens et al.

(10) Patent No.: US 12,775,454 B2
(45) Date of Patent: Oct. 27, 2026

(54) SYSTEM AND METHOD FOR GENERATING SOFTWARE DEVELOPMENT KITS WITH SOFTWARE CODE COMPONENTS

(71) Applicant: BANK OF AMERICA CORPORATION, Charlotte, NC (US)

(72) Inventors: Rashida Najiee Stephens, Fairburn, GA (US); Jose L. Fuguet, Cumming, GA (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 276 days.

(21) Appl. No.: 18/604,022

(22) Filed: Mar. 13, 2024

(65) Prior Publication Data

US 2025/0291563 A1 Sep. 18, 2025

(51) Int. Cl.
*G06F 8/36* (2018.01)
*G06F 8/35* (2018.01)

(52) U.S. Cl.
CPC . *G06F 8/36* (2013.01); *G06F 8/35* (2013.01)

(58) Field of Classification Search
CPC .................................... G06F 8/35; G06F 8/36
USPC .................................................. 717/106–113
See application file for complete search history.

(56) References Cited

U.S. PATENT DOCUMENTS 9,239,705 B2 1/2016 Chandaria et al.
9,678,726 B1 6/2017 Massaguer et al.
9,703,680 B1 7/2017 Chang et al.
10,185,556 B2 1/2019 Richstein et al.
10,489,126 B2 11/2019 Kumar et al.
10,673,789 B2 * 6/2020 Ananthapur Bache ...................... G06F 40/14
10,983,759 B1 4/2021 Kumar et al.
11,269,308 B2 3/2022 Chandaria
11,755,295 B2 * 9/2023 Bansal .................. G06F 40/186 717/106
12,223,309 B2 2/2025 Rao Krishnagi et al.
2017/0102925 A1 4/2017 Ali et al.
2019/0286424 A1 9/2019 Brown et al.
2021/0026757 A1 1/2021 Rodriguez et al.
2023/0418822 A1 * 12/2023 Ji ........................ G06F 16/2457

OTHER PUBLICATIONS

Tech Mastery, "Transforming API Development: How to Use ChatGPT for OpenAPI Specs", 2023, retrieved from https://www.albinsblog.com/2023/11/ransforming-api-documentation-through-chatgpt-genai.html , 8 pages. (Year: 2023).*

(Continued)

*Primary Examiner* — Ted T. Vo
(74) *Attorney, Agent, or Firm* — Moore & Van Allen PLLC; Nicholas C. Russell

(57) ABSTRACT

Embodiments of the present invention provide a system for generating software development kits with software code components. The system is configured for receiving a request from a kit recipient system for a software development kit, wherein the request comprises kit requirements, analyzing the request and the kit requirements, via an artificial intelligence engine, generating, via the artificial intelligence engine, one or more software code components based on the kit requirements, generating the software development kit comprising the one or more software code components, and transmitting the software development kit to the kit recipient system.

17 Claims, 6 Drawing Sheets

(56) References Cited

OTHER PUBLICATIONS

Thomas Lore, "How to Build an API Using ChatGPT", 2023, Stoplight Blog, retrieved from https://blog.stoplight.io/how-to-build-an-api-using-chatgpt , 10 pages. (Year: 2023).*

Selfboot.cn, "Learning to Write a Python SDK Library for ChatGPT API from OpenAI", Jan. 2024, retrieved from https://selfboot.cn/en/2024/01/09/openai_python_sdk_learn/, 11 pages. (Year: 2024).*

* cited by examiner

SYSTEM AND METHOD FOR GENERATING SOFTWARE DEVELOPMENT KITS WITH SOFTWARE CODE COMPONENTS

BACKGROUND

There exists a need for a system for generating software development kits with software code components.

BRIEF SUMMARY

Embodiments of the present invention address the above needs and/or achieve other advantages by providing apparatuses (e.g., a system, computer program product and/or other devices) and methods for generating software development kits with software code components. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

In some embodiments, the present invention receives a request from a kit recipient system for a software development kit, wherein the request comprises kit requirements, analyzes the request and the kit requirements, via an artificial intelligence engine, generates, via the artificial intelligence engine, one or more software code components based on the kit requirements, generates the software development kit comprising the one or more software code components, and transmits the software development kit to the kit recipient system.

In some embodiments, the present invention prompts the kit recipient system to provide feedback associated with the transmitted software development kit, receives the feedback from the kit recipient system, dynamically alters the one or more software code components in the software development kit based on the feedback received from the kit recipient system, and transmits altered software development kit to the kit recipient system.

In some embodiments, the present invention trains the artificial intelligence engine based on training data, wherein the training data comprises historical software kit development data and historical requirement data.

In some embodiments, the present invention onboards a plurality of kit recipient systems.

In some embodiments, the kit requirements comprise required features and required functionalities.

In some embodiments, the one or more software code components are pre-validated by the kit recipient system, wherein the pre-validated one or more software code components are not associated with any historical anomalies when integrated with the kit recipient system.

In some embodiments, the one or more software code components comprise pre-certified software code components.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
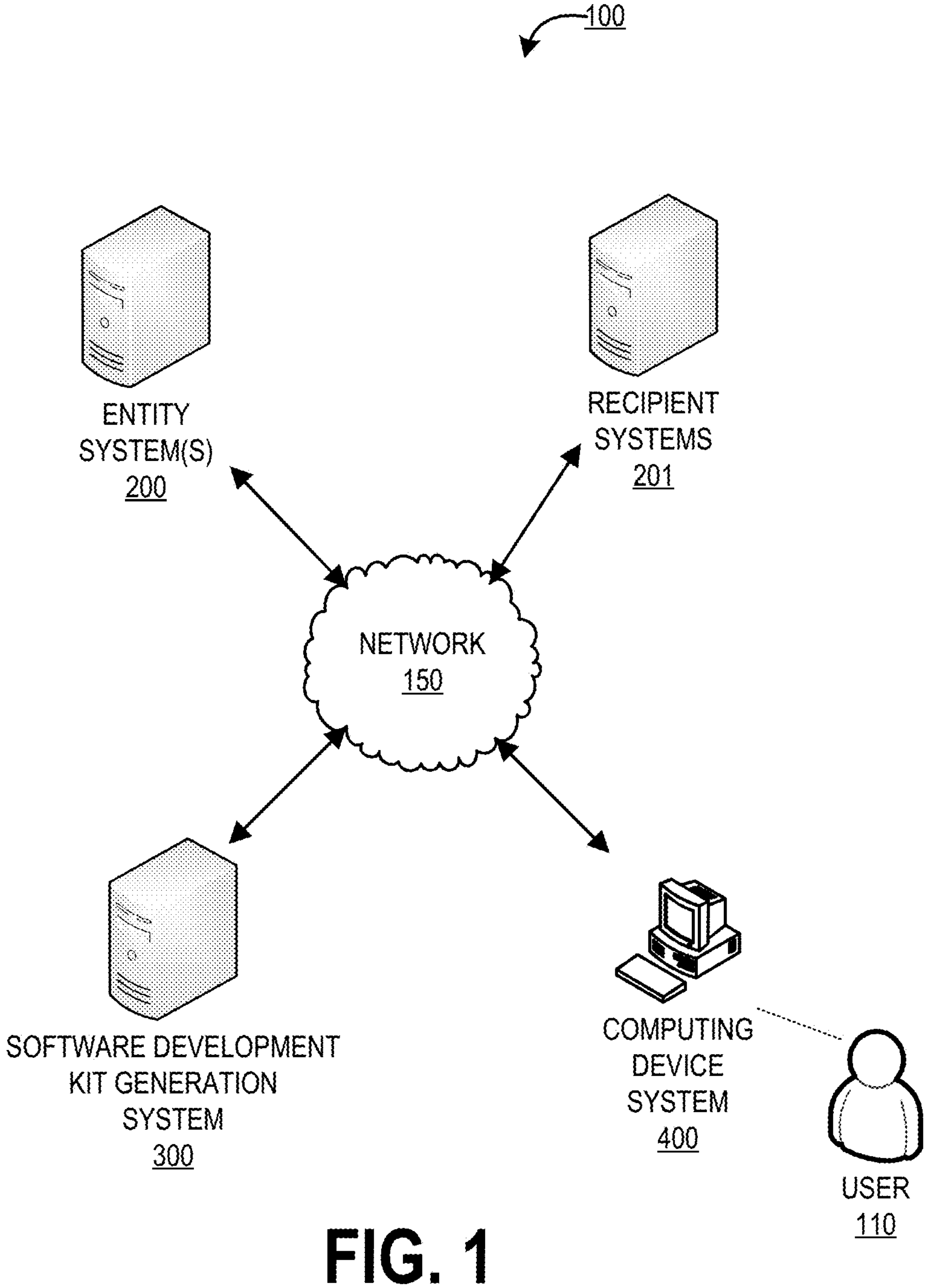
Figure 2:
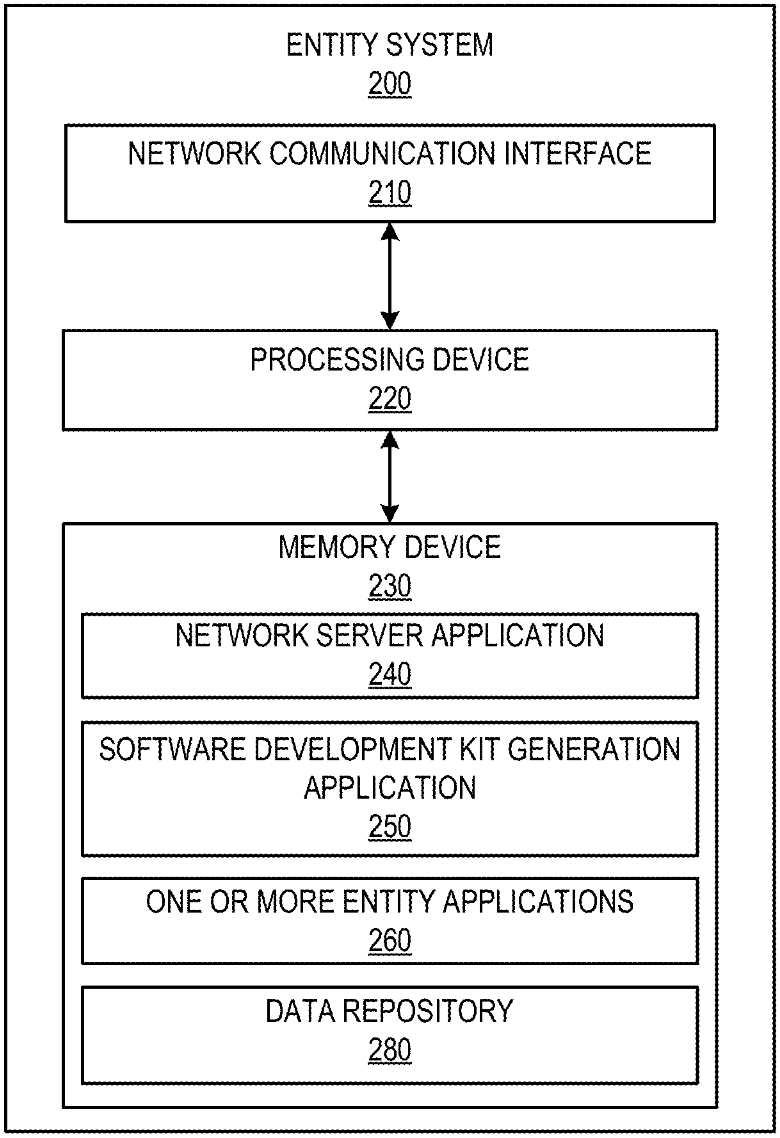
Figure 3:
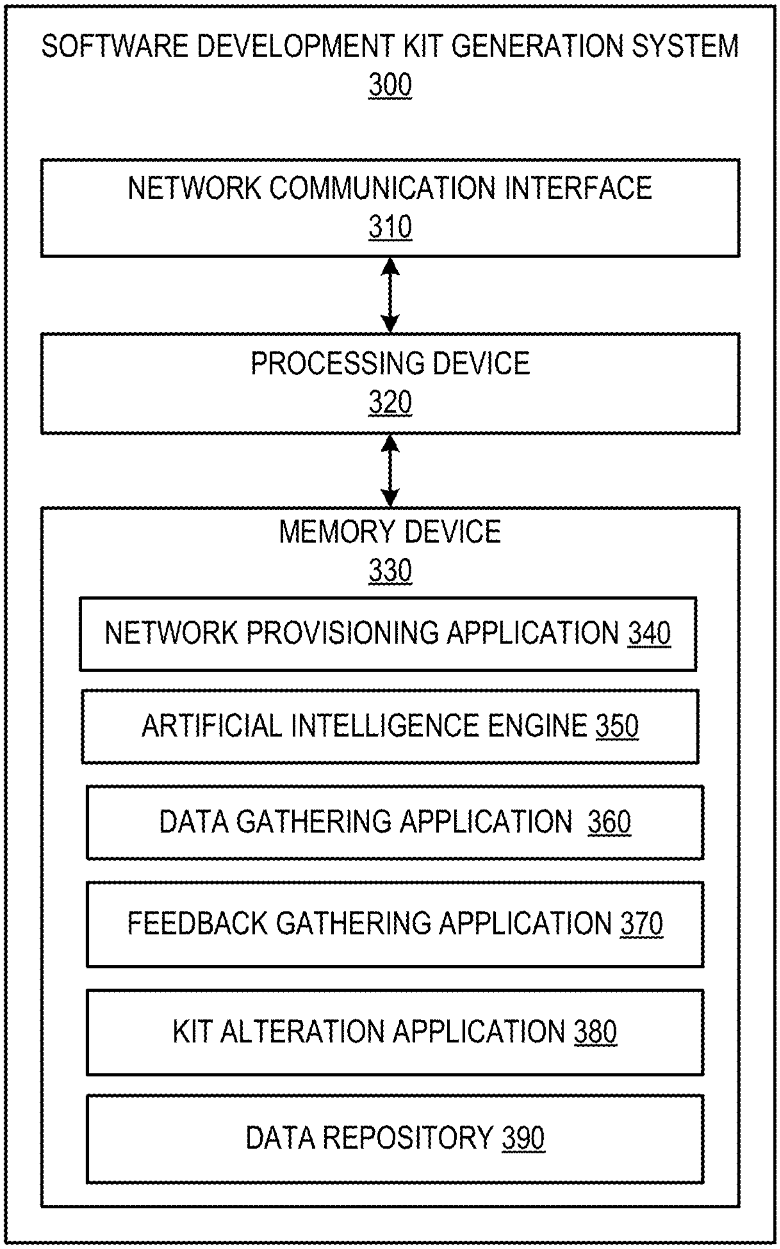
Figure 4:
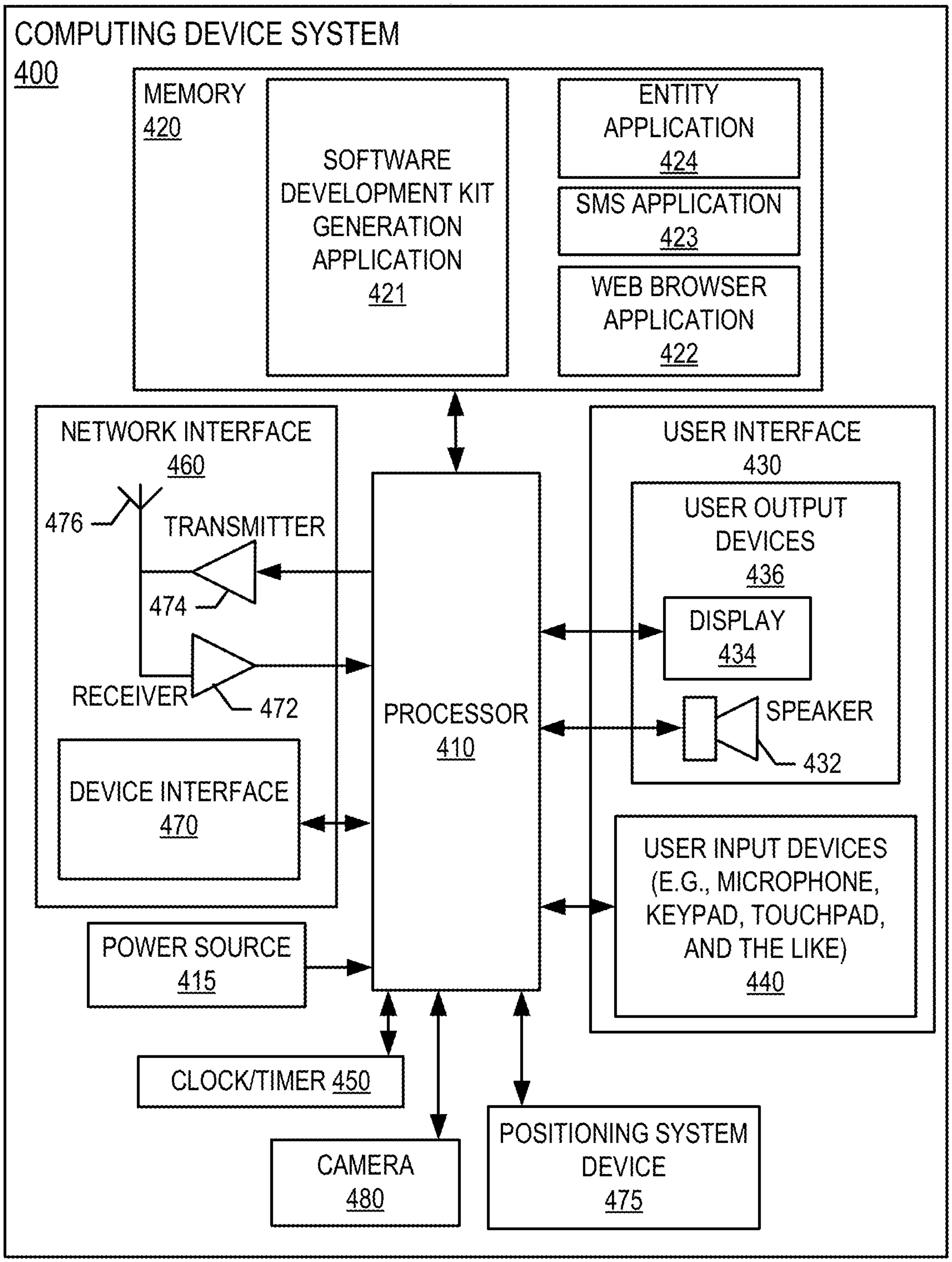
Figure 5A:
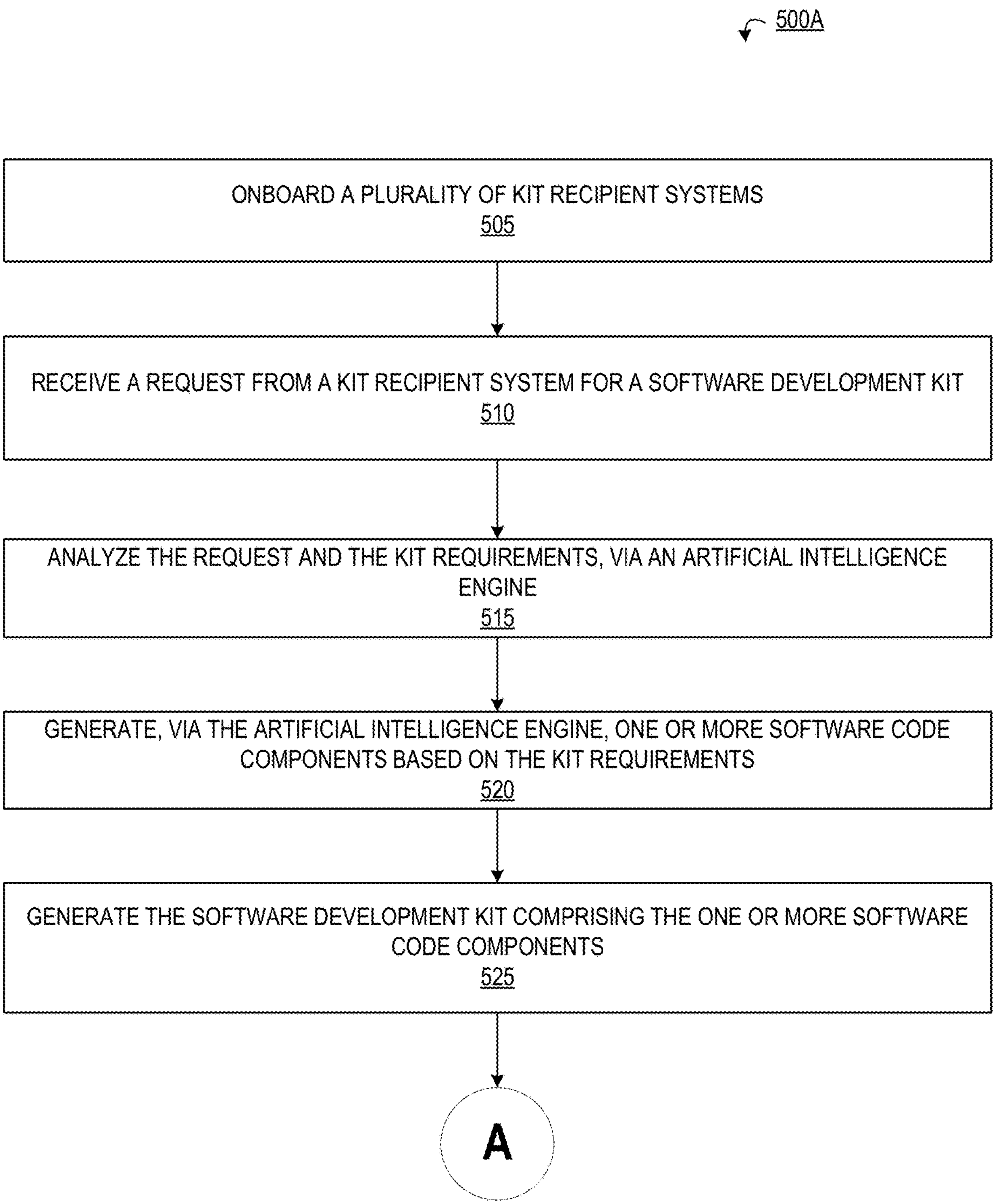
Figure 5B:
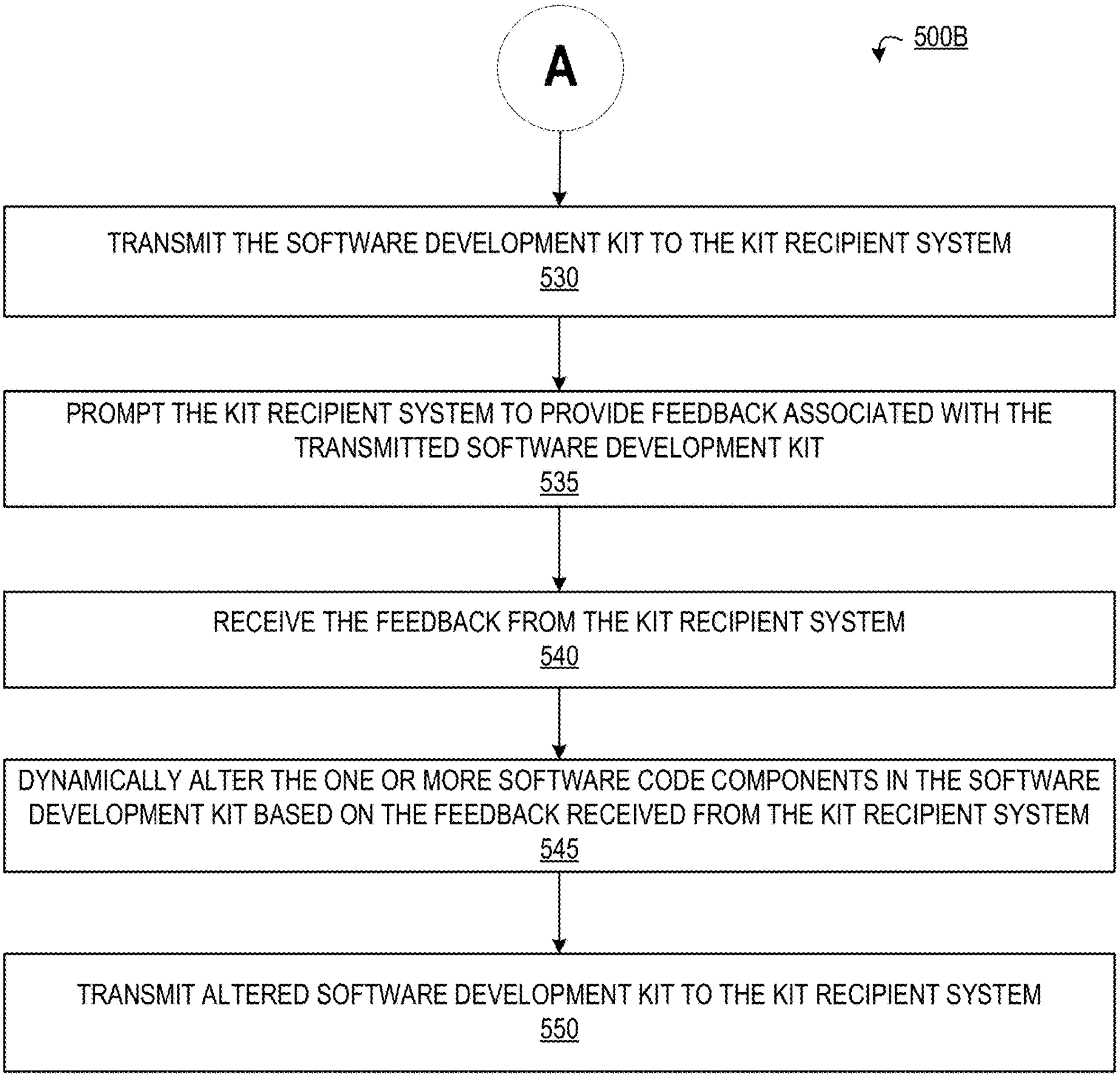

Having thus described embodiments of the invention in general terms, reference will now be made the accompanying drawings, wherein:

FIG. 1 provides a block diagram illustrating a system environment for generating software development kits with software code components, in accordance with an embodiment of the invention;

FIG. 2 provides a block diagram illustrating the entity system 200 of FIG. 1, in accordance with an embodiment of the invention;

FIG. 3 provides a block diagram illustrating a software development kit generation system 300 of FIG. 1, in accordance with an embodiment of the invention;

FIG. 4 provides a block diagram illustrating the computing device system 400 of FIG. 1, in accordance with an embodiment of the invention; and FIGS. 5A and 5B provide a process flow for generating software development kits with software code components, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term “a” and/or “an” shall mean “one or more,” even though the phrase “one or more” is also used herein. Furthermore, when it is said herein that something is “based on” something else, it may be based on one or more other things as well. In other words, unless expressly indicated otherwise, as used herein “based on” means “based at least in part on” or “based at least partially on.” Like numbers refer to like elements throughout.

As described herein, the term “entity” may be any organization that creates, manages, develops, provides, maintains, and/or uses one or more applications (e.g., web applications, mobile applications, or the like) to perform one or more activities. In some embodiments, the entity may be a financial institution which may include any financial institutions such as commercial banks, thrifts, federal and state savings banks, savings and loan associations, credit unions, investment companies, insurance companies and the like. In some embodiments, the entity may be a non-financial institution.

Many of the example embodiments and implementations described herein contemplate interactions engaged in by a user with a computing device and/or one or more communication devices and/or secondary communication devices. A "user", as referenced herein, may refer to an entity or individual that has the ability and/or authorization to develop, access, and/or use one or more applications, systems, servers, and/or devices provided by the entity and/or the system of the present invention. Furthermore, as used herein, the term "user computing device" or "mobile device" may refer to mobile phones, computing devices, tablet computers, wearable devices, smart devices and/or any portable electronic device capable of receiving and/or storing data therein.

A "user interface" is any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user or to output data to a user. These input and output devices may include a display, mouse, keyboard, button, touchpad, touch screen, microphone, speaker, LED, light, joystick, switch, buzzer, bell, and/or other user input/output device for communicating with one or more users.

As used herein, "machine learning algorithms" may refer to programs (math and logic) that are configured to self-adjust and perform better as they are exposed to more data. To this extent, machine learning algorithms are capable of adjusting their own parameters, given feedback on previous performance in making a prediction about a dataset. Machine learning algorithms contemplated, described, and/or used herein include supervised learning (e.g., using logistic regression, using back propagation neural networks, using random forests, decision trees, and the like), unsupervised learning (e.g., using an Apriori algorithm, using K-means clustering), semi-supervised learning, reinforcement learning (e.g., using a Q-learning algorithm, using temporal difference learning), and/or any other suitable machine learning model types. Each of these types of machine learning algorithms can implement any of one or more of a regression algorithm (e.g., ordinary least squares, logistic regression, stepwise regression, multivariate adaptive regression splines, locally estimated scatterplot smoothing, and the like), an instance-based method (e.g., k-nearest neighbor, learning vector quantization, self-organizing map, and the like), a regularization method (e.g., ridge regression, least absolute shrinkage and selection operator, elastic net, and the like), a decision tree learning method (e.g., classification and regression tree, C4.5, chi-squared automatic interaction detection, decision stump, random forest, multivariate adaptive regression splines, gradient boosting machines, and the like), a Bayesian method (e.g., naïve Bayes, averaged one-dependence estimators, Bayesian belief network, and the like), a kernel method (e.g., a support vector machine, a radial basis function, a linear analysis, and the like), a clustering method (e.g., k-means clustering, expectation maximization, and the like), an associated rule learning algorithm, an artificial neural network model (e.g., a Perceptron method, a back-propagation method, a Hopfield network method, a self-organizing map method, a learning vector quantization method, and the like), a deep learning algorithm (e.g., a deep belief network method, a convolution network method, a stacked auto-encoder method, and the like), a dimensionality reduction method (e.g., principal component analysis, partial least squares regression, multidimensional scaling, projection pursuit, and the like), an ensemble method (e.g., boosting, bootstrapped aggregation, stacked generalization, gradient boosting machine method, random forest method, and the like), and/or any suitable form of machine learning algorithm.

As used herein, "machine learning model" may refer to a mathematical model generated by machine learning algorithms based on sample data, known as training data, to make predictions or decisions without being explicitly programmed to do so. The machine learning model represents what was learned by the machine learning algorithm and represents the rules, numbers, and any other algorithm-specific data structures required to for classification.

Typically, each entity has to develop software development solutions which can be time consuming and prone to errors. Software solutions that are provided by entities are static and are not tailored to each individual recipient system, thereby causing anomalies and reducing the processing efficiency of recipient systems. As such, there exists a need for a system that generates tailored software development kits for a plurality of recipient systems.

FIG. 1 provides a block diagram illustrating a system environment 100 for generating software development kits with software code components, in accordance with an embodiment of the invention. As illustrated in FIG. 1, the environment 100 includes a software development kit generation system 300, entity system 200, recipient systems 201, and a computing device system 400. One or more users 110 may be included in the system environment 100, where the users 110 interact with the other entities of the system environment 100 via a user interface of the computing device system 400. In some embodiments, the one or more user(s) 110 of the system environment 100 may be employees of an entity associated with the entity system 200 (e.g., software engineer, application developer, application tester, and/or the like). In some embodiments, the one or more user(s) 110 of the system environment 100 may further comprise end-users which may include, but are not limited to, customers, potential customers, or the like of the entity associated with the entity system 200. In some such embodiments, the end-users may be the recipient systems 201. In some embodiments, the one or more users 110 may be users associated with the recipient systems 201.

The entity system(s) 200 may be any system owned or otherwise controlled by an entity to support or perform one or more process steps described herein. In some embodiments, the entity is a financial institution. In some embodiments, the entity is a non-financial institution. In some embodiments, the recipient systems 201 may be any organization that utilizes one or more software solutions provided by the entity associated with the entity system 200.

The software development kit generation system 300 is a system of the present invention for performing one or more process steps described herein. In some embodiments, the software development kit generation system 300 may be an independent system. In some embodiments, the software development kit generation system 300 may be a part of the entity system 200.

The software development kit generation system 300, the entity system 200, and/or the computing device system 400 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In general, the software development kit generation system 300 is configured to communicate information or instructions with the entity system 200, and/or the computing device system 400 across the network 150.

The computing device system 400 may be a computing device of the user 110. In general, the computing device system 400 communicates with the user 110 via a user interface of the computing device system 400, and in turn is configured to communicate information or instructions with the software development kit generation system 300 and/or entity system 200 across the network 150.

FIG. 2 provides a block diagram illustrating the entity system 200, in greater detail, in accordance with embodiments of the invention. As illustrated in FIG. 2, in one embodiment of the invention, the entity system 200 includes one or more processing devices 220 operatively coupled to a network communication interface 210 and a memory device 230. In certain embodiments, the entity system 200 is operated by an entity, such as a financial institution, while in other embodiments, the entity system 200 is operated by an entity other than a financial institution.

It should be understood that the memory device 230 may include one or more databases or other data structures/repositories. The memory device 230 also includes computer-executable program code that instructs the processing device 220 to operate the network communication interface 210 to perform certain communication functions of the entity system 200 described herein. For example, in one embodiment of the entity system 200, the memory device 230 includes, but is not limited to, a network server application 240, a software development kit generation application 250, one or more entity applications 260, and a data repository 280. The computer-executable program code of the network server application 240, the software development kit generation application 250, and the one or more entity applications 260 to perform certain logic, data-extraction, and data-storing functions of the entity system 200 described herein, as well as communication functions of the entity system 200.

The network server application 240, the software development kit generation application 250, and the one or more entity applications 260 are configured to store data in the data repository 280 or to use the data stored in the data repository 280 when communicating through the network communication interface 210 with the software development kit generation system 300, and the computing device system 400 to perform one or more process steps described herein. In some embodiments, the entity system 200 may receive instructions from the software development kit generation system 300 via the software development kit generation application 250 to perform certain operations. The software development kit generation application 250 may be provided by the software development kit generation system 300.

FIG. 3 provides a block diagram illustrating the software development kit generation system 300 in greater detail, in accordance with embodiments of the invention. As illustrated in FIG. 3, in one embodiment of the invention, the software development kit generation system 300 includes one or more processing devices 320 operatively coupled to a network communication interface 310 and a memory device 330. In certain embodiments, the software development kit generation system 300 is operated by an entity, such as a financial institution, while in other embodiments, the software development kit generation system 300 is operated by an entity other than a financial institution. In some embodiments, the software development kit generation system 300 is owned or operated by the entity of the entity system 200. In some embodiments, the software development kit generation system 300 may be an independent system. In alternate embodiments, the software development kit generation system 300 may be a part of the entity system 200.

It should be understood that the memory device 330 may include one or more databases or other data structures/repositories. The memory device 330 also includes computer-executable program code that instructs the processing device 320 to perform one or more data processing operations and to operate the network communication interface 310 to perform certain communication functions of the software development kit generation system 300 described herein. For example, in one embodiment of the software development kit generation system 300, the memory device 330 includes, but is not limited to, a network provisioning application 340, an artificial intelligence engine 350, a data gathering application 360, a feedback gathering application 370, a kit alteration application 380, and a data repository 390 comprising data processed or accessed by one or more applications in the memory device 330. The computer-executable program code of the network provisioning application 340, the artificial intelligence engine 350, the data gathering application 360, the feedback gathering application 370, and the kit alteration application 380 may instruct the processing device 320 to perform certain logic, data-processing, and data-storing functions of the software development kit generation system 300 described herein, as well as communication functions of the software development kit generation system 300.

The network provisioning application 340, the artificial intelligence engine 350, the data gathering application 360, the feedback gathering application 370, and the kit alteration application 380 are configured to invoke or use the data in the data repository 390 when communicating through the network communication interface 310 with the entity system 200, and the computing device system 400. In some embodiments, the network provisioning application 340, the artificial intelligence engine 350, the data gathering application 360, the feedback gathering application 370, and the kit alteration application 380 may store the data extracted or received from the entity system 200 and the computing device system 400 in the data repository 390. In some embodiments, the network provisioning application 340, the artificial intelligence engine 350, the data gathering application 360, the feedback gathering application 370, and the kit alteration application 380 may be a part of a single application. One or more processes performed by the network provisioning application 340, the artificial intelligence engine 350, the data gathering application 360, the feedback gathering application 370, and the kit alteration application 380 are described in detail below.

FIG. 4 provides a block diagram illustrating a computing device system 400 of FIG. 1 in more detail, in accordance with embodiments of the invention. However, it should be understood that the computing device system 400 is merely illustrative of one type of computing device system that may benefit from, employ, or otherwise be involved with embodiments of the present invention and, therefore, should not be taken to limit the scope of embodiments of the present invention. The computing devices may include any one of portable digital assistants (PDAs), pagers, mobile televisions, mobile phone, entertainment devices, desktop computers, workstations, laptop computers, cameras, video recorders, audio/video player, radio, GPS devices, wearable devices, Internet-of-things devices, augmented reality devices, virtual reality devices, automated teller machine devices, electronic kiosk devices, or any combination of the aforementioned.

Some embodiments of the computing device system 400 include a processor 410 communicably coupled to such devices as a memory 420, user output devices 436, user input devices 440, a network interface 460, a power source 415, a clock or other timer 450, a camera 480, and a positioning system device 475. The processor 410, and other processors described herein, generally include circuitry for implementing communication and/or logic functions of the computing device system 400. For example, the processor 410 may include a digital signal processor device, a microprocessor device, and various analog to digital converters, digital to analog converters, and/or other support circuits. Control and signal processing functions of the computing device system 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the computing device system 400 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 150. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of the wireless network 150. In this regard, the computing device system 400 may be configured to operate with one or more air interface standards, communication protocols, modulation types, and access types. By way of illustration, the computing device system 400 may be configured to operate in accordance with any of a number of first, second, third, and/or fourth-generation communication protocols and/or the like. For example, the computing device system 400 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with LTE protocols, with 4GPP protocols and/or the like. The computing device system 400 may also be configured to operate in accordance with non-cellular communication mechanisms, such as via a wireless local area network (WLAN) or other communication/data networks.

As described above, the computing device system 400 has a user interface that is, like other user interfaces described herein, made up of user output devices 436 and/or user input devices 440. The user output devices 436 include a display 430 (e.g., a liquid crystal display or the like) and a speaker 432 or other audio device, which are operatively coupled to the processor 410.

The user input devices 440, which allow the computing device system 400 to receive data from a user such as the user 110 may include any of a number of devices allowing the computing device system 400 to receive data from the user 110, such as a keypad, keyboard, touch-screen, touchpad, microphone, mouse, joystick, other pointer device, button, soft key, and/or other input device(s). The user interface may also include a camera 480, such as a digital camera.

The computing device system 400 may also include a positioning system device 475 that is configured to be used by a positioning system to determine a location of the computing device system 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate or exact geographical location of the computing device system 400. In other embodiments, the positioning system device 475 includes a proximity sensor or transmitter, such as an RFID tag, that can sense or be sensed by devices known to be located proximate a merchant or other location to determine that the computing device system 400 is located proximate these known devices.

The computing device system 400 further includes a power source 415, such as a battery, for powering various circuits and other devices that are used to operate the computing device system 400. Embodiments of the computing device system 400 may also include a clock or other timer 450 configured to determine and, in some cases, communicate actual or relative time to the processor 410 or one or more other devices.

The computing device system 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/code executed by the processor 410 to implement the functions of the computing device system 400 and/or one or more of the process/method steps described herein. For example, the memory 420 may include such applications as a conventional web browser application 422, a software development kit generation application 421, an entity application 424, or the like. These applications also typically instructions to a graphical user interface (GUI) on the display 430 that allows the user 110 to interact with the entity system 200, the software development kit generation system 300, and/or other devices or systems. The memory 420 of the computing device system 400 may comprise a Short Message Service (SMS) application 423 configured to send, receive, and store data, information, communications, alerts, and the like via the wireless network 150.

The memory 420 can also store any of a number of pieces of information, and data, used by the computing device system 400 and the applications and devices that make up the computing device system 400 or are in communication with the computing device system 400 to implement the functions of the computing device system 400 and/or the other systems described herein.

FIGS. 5A and 5B provide a process flow for generating software development kits with software code components, in accordance with an embodiment of the invention. As shown in block 505, the system onboards a plurality of kit recipient systems. The plurality of kit recipient systems may be any organizations that utilize or intending to use the software solutions (e.g., software development kits or the like) provided by the system of the present invention.

As shown in block 510, the system receives a request from a kit recipient system for a software development kit. The request may be a request for the software development kit for a software solution that the kit recipient system is seeking. The software development kit may be a set of software tools and programs (also referred to as software code components) which may be used by the kit recipient system to build applications or frameworks. In other words, the software development kit may be used by the kit recipient system to develop applications with functionalities without having to develop the applications from scratch. The software development kit may allow the kit recipient system to integrate the software tools and programs in the software development kit with existing systems or applications associated with the kit recipient system. In some embodiments, the software tools and programs in the software development kit may be developed and/or owned by an entity associated with the system of the present invention (e.g., entity system 200). In some embodiments, the request comprises kit requirements which may include but are not limited to required functionalities, required features associated with the software solution.

As shown in block 515, the system analyzes the request and the kit requirements, via an artificial intelligence engine. For example, the system may analyze the request and the kit requirements to identify that the software development kit requested by the kit recipient system must comprise a first piece of software program code associated with a first functionality in a first programming language, a second piece of software code associated with a second functionality in a second programming language, and a software tool.

As shown in block 520, the system generates, via the artificial intelligence engine, one or more software code components based on the kit requirements. The artificial intelligence engine may be trained by the system of the invention using training data to analyze the request and the kit requirements and generate the one or more software code components based on analyzing the request and the kit requirements. In some embodiments, the one or more software code components may be components that are pre-validated by the kit recipient system that the one or more software code components are not associated with any historical anomalies when integrated with the kit recipient system. In some embodiments, the one or more software code components may be components that are pre-validated by the kit recipient system, where the pre-validated one or more software code components are not associated with any historical anomalies when integrated with the kit recipient system. For example, the pre-validated one or more software code components may be components that when integrated with applications, networks, servers, systems, and/or the like associated with the kit recipient system in the previous instances did not cause any service disruptions, errors, or failures. In some embodiments, the one or more software code components may be components that are pre-certified. Pre-certified components may be any components that are standardized components that may be used as building blocks while developing applications.

As shown in block 525, the system generates the software development kit comprising the one or more software code components. The system may bundle the one or more software components and may generate an executable package. The software development kit generated by the system is tailored to the kit recipient system that initiated the request. As shown in block 530, the system transmits the software development kit to the kit recipient system.

As shown in block 535, the system prompts the kit recipient system to provide feedback associated with the transmitted software development kit. As shown in block 540, the system receives the feedback from the kit recipient system. Feedback may comprise information associated with any errors, anomalies, synchronization issues, and/or the like that the kit recipient system may experience upon execution and/or the integration of the one or more software code components in the software development kit.

As shown in block 545, the system dynamically alters the one or more software code components in the software development kit based on the feedback received from the kit recipient system. Dynamically altering the one or more software code components may comprise replacing at least a part of the one or more software code components to address the errors, anomalies, synchronization issues, or the like. As shown in block 550, the system transmits altered software development kit to the kit recipient system. The system thereby allows uses an artificial intelligence engine to dynamically generate software development kits and automatically modify them in real-time based on the feedback received from the kit recipient system to rectify and mitigate any issues caused by execution and/or integration of the software development kit with the kit recipient system.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language. However, the computer program code for carrying out operations of embodiments of the present invention may also be written in conventional procedural programming languages, such as the “C” programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be “configured to” perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for generating software development kits with software code components, comprising:

at least one processing device;

at least one memory device; and a module stored in the at least one memory device comprising executable instructions that when executed by the at least one processing device, cause the at least one processing device to:

receive a request from a kit recipient system for a software development kit, wherein the request comprises kit requirements;

analyze the request and the kit requirements, via an artificial intelligence engine;

generate, via the artificial intelligence engine, one or more software code components based on the kit requirements, wherein the software development kit is bundled as an executable package tailored to the kit recipient system;

generate the software development kit comprising the one or more software code components;

transmit the software development kit to the kit recipient system;

prompt the kit recipient system to provide feedback associated with the software development kit, wherein the feedback comprises information associated with errors, anomalies, or synchronization issues experienced by the kit recipient system upon execution or integration of the one or more software code components in the software development kit;

receive the feedback from the kit recipient system;

dynamically alter, in real-time, the one or more software code components in the software development kit based on the feedback received from the kit recipient system, wherein dynamically altering the one or more software code components comprises replacing at least a part of the one or more software code components to address the errors, anomalies, or synchronization issues; and transmit the altered software development kit to the kit recipient system.

2. The system according to claim 1, wherein the executable instructions cause the at least one processing device to train the artificial intelligence engine based on training data, wherein the training data comprises historical software kit development data and historical requirement data.

3. The system according to claim 1, wherein the executable instructions cause the at least one processing device to onboard a plurality of kit recipient systems.

4. The system according to claim 1, wherein the kit requirements comprise required features and required functionalities.

5. The system according to claim 1, wherein the one or more software code components are pre-validated by the kit recipient system, wherein the pre-validated one or more software code components are not associated with any historical anomalies when integrated with the kit recipient system.

6. The system according to claim 1, wherein the one or more software code components comprise pre-certified software code components.

7. A computer program product for generating software development kits with software code components, comprising a non-transitory computer-readable storage medium having computer-executable instructions for:

receiving a request from a kit recipient system for a software development kit, wherein the request comprises kit requirements;

analyzing the request and the kit requirements, via an artificial intelligence engine;

generating, via the artificial intelligence engine, one or more software code components based on the kit requirements, wherein the software development kit is bundled as an executable package tailored to the kit recipient system;

generating the software development kit comprising the one or more software code components;

transmitting the software development kit to the kit recipient system;

prompting the kit recipient system to provide feedback associated with the software development kit, wherein the feedback comprises information associated with errors, anomalies, or synchronization issues experienced by the kit recipient system upon execution or integration of the one or more software code components in the software development kit;

receiving the feedback from the kit recipient system;

dynamically altering, in real-time, the one or more software code components in the software development kit based on the feedback received from the kit recipient system, wherein dynamically altering the one or more software code components comprises replacing at least a part of the one or more software code components to address the errors, anomalies, or synchronization issues; and transmitting the altered software development kit to the kit recipient system.

8. The computer program product according to claim 7, wherein the non-transitory computer-readable storage medium comprises computer-executable instructions for training the artificial intelligence engine based on training data, wherein the training data comprises historical software kit development data and historical requirement data.

9. The computer program product according to claim 7, wherein the non-transitory computer-readable storage medium comprises computer-executable instructions for onboarding a plurality of kit recipient systems.

10. The computer program product according to claim 7, wherein the one or more software code components are pre-validated by the kit recipient system, wherein the pre-validated one or more software code components are not associated with any historical anomalies when integrated with the kit recipient system.

11. The computer program product according to claim 7, wherein the one or more software code components comprise pre-certified software code components.

12. The computer program product according to claim 7, wherein the kit requirements comprise required features and required functionalities.

13. A computerized method for generating software development kits with software code components, the method comprising:

receiving a request from a kit recipient system for a software development kit, wherein the request comprises kit requirements;

analyzing the request and the kit requirements, via an artificial intelligence engine;

generating, via the artificial intelligence engine, one or more software code components based on the kit requirements, wherein the software development kit is bundled as an executable package tailored to the kit recipient system;

generating the software development kit comprising the one or more software code components;

transmitting the software development kit to the kit recipient system;

prompting the kit recipient system to provide feedback associated with the software development kit, wherein the feedback comprises information associated with errors, anomalies, or synchronization issues experienced by the kit recipient system upon execution or integration of the one or more software code components in the software development kit;

receiving the feedback from the kit recipient system;

dynamically altering, in real-time, the one or more software code components in the software development kit based on the feedback received from the kit recipient system, wherein dynamically altering the one or more software code components comprises replacing at least a part of the one or more software code components to address the errors, anomalies, or synchronization issues; and transmitting the altered software development kit to the kit recipient system.

14. The computerized method according to claim 13, wherein the one or more software code components are pre-validated by the kit recipient system, wherein the pre-validated one or more software code components are not associated with any historical anomalies when integrated with the kit recipient system.

15. The computerized method according to claim 13, wherein the method comprises training the artificial intelligence engine based on training data, wherein the training data comprises historical software kit development data and historical requirement data.

16. The computerized method according to claim 13, wherein the method comprises onboarding a plurality of kit recipient systems.

17. The computerized method according to claim 13, wherein the one or more software code components comprise pre-certified software code components.

* * * * *